U. G. CADY.
HARROW.
APPLICATION FILED JULY 16, 1918.
1,301,226.
Patented Apr. 22, 1919.
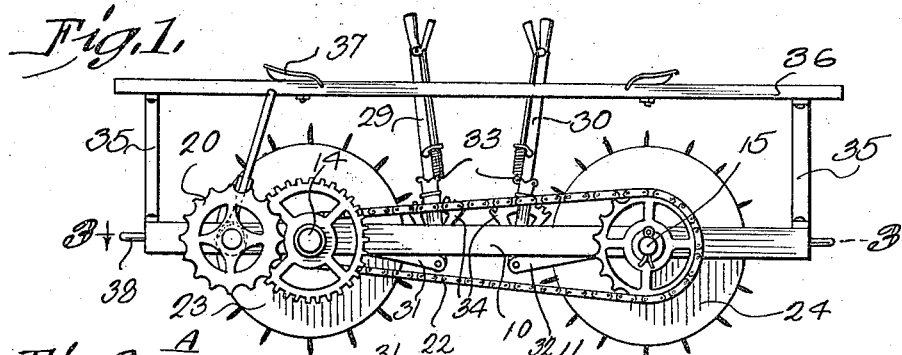
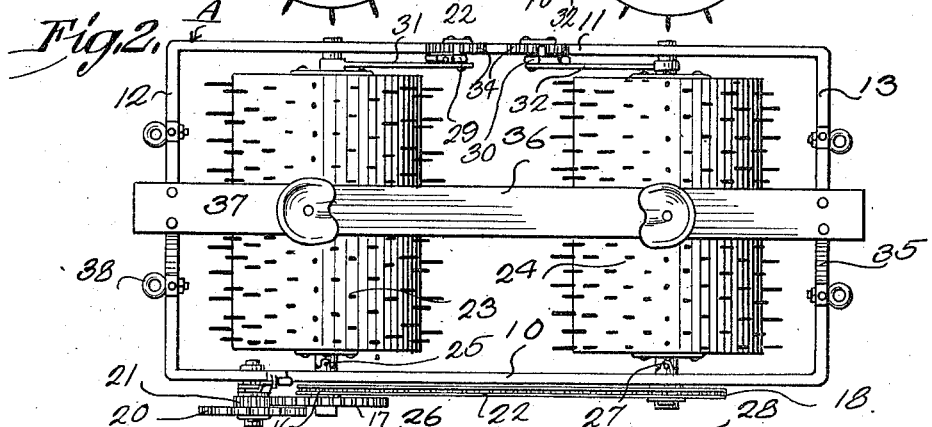
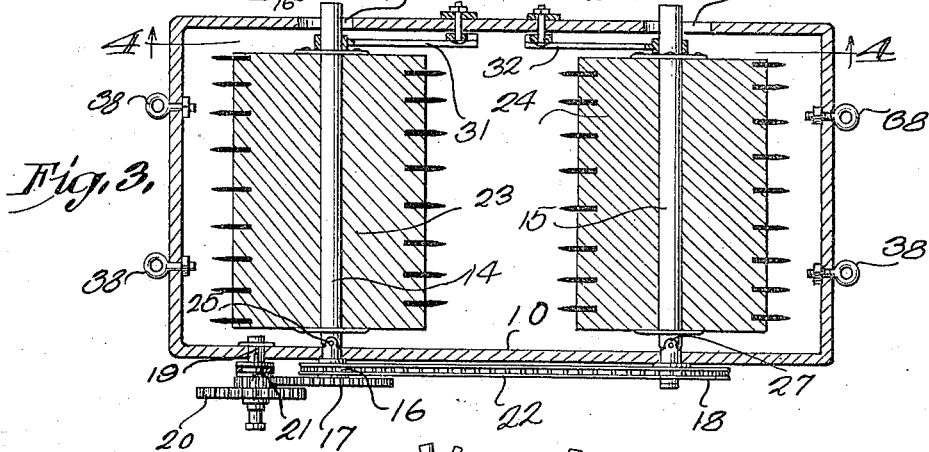
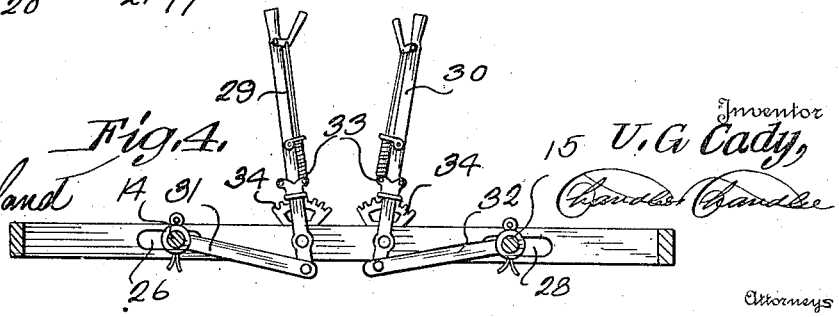
Witnesses
R. W. Hoagland
Inventor
U. G. Cady,
Attorneys

UNITED STATES PATENT OFFICE.

ULYSSES G. CADY, OF DURKEE, OREGON, ASSIGNOR OF ONE-HALF TO EDWIN B. GRAVES, OF DURKEE, OREGON.

HARROW.

1,301,226. Specification of Letters Patent. Patented Apr. 22, 1919.

Application filed July 16, 1918. Serial No. 245,167.

*To all whom it may concern:*

Be it known that I, ULYSSES G. CADY, a citizen of the United States, residing at Durkee, in the county of Baker, State of Oregon, have invented certain new and useful Improvements in Harrows; and I do hereby declare the following to be a full, clear, and exact description of the invention, such as will enable others skilled in the art to which it appertains to make and use the same.

This invention relates to harrows.

The object of the invention resides in the provision of a harrow in which is embodied an improved construction including a pair of toothed cylinders having their axes of rotation normally parallel and capable of adjustment to dispose said axes at an angle to each other.

A further object of the invention resides in the provision of a harrow in which the cylinders may be rotated in the same direction at different speeds or in reverse directions at different speeds.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a harrow constructed in accordance with the invention;

Fig. 2 is a plan view thereof;

Fig. 3 is a section on the line 3—3 of Fig. 1, and

Fig. 4 is a section on the line 4—4 of Fig. 3.

Referring to the drawings the improved harrow is shown as comprising a frame A including side members 10 and 11 and end members 12 and 13. Journaled in the side members 10 are shafts 14 and 15. The shaft 14 has fixed thereon a sprocket wheel 16 and a gear 17, while the shaft 15 has fixed thereon a sprocket wheel 18. Carried by the side member 10 outwardly of the shaft 15 is a shaft 19 upon which is rotatably mounted a sprocket wheel 20 having fixed thereon a gear 21 meshing with the gear 17. A sprocket chain 22 is adapted to travel on the sprocket wheels 16 and 18 when it is desired to rotate the shafts 14 and 15 in the same direction, and at different speeds of rotation, it being noted in this connection that the sprocket wheel 18 has a greater diameter than the sprocket wheel 16. Disposed between the side members 10 and 11 are toothed cylinders 23 and 24. One of the trunnions of the cylinder 23 is connected to the shaft 14 by a universal joint 25, while the other trunnion of said cylinder is slidably engaged in a slot 26 in the side member 11. Likewise one of the trunnions of the cylinder 24 is connected to the shaft 15 by a universal joint 27, while the other trunnion of the cylinder 24 is slidably engaged in a slot 28 formed in the side member 11. Pivoted on the inner side of the side member 11 are levers 29 and 30. The lower end of the lever 29 is connected to the adjacent trunnion of the cylinder 23 by means of a link 31, while the lower end of the lever 30 is connected to the adjacent trunnion of the cylinder 24 by means of a link 32. The levers 29 and 30 carry spring pawls 33 respectively which are adapted to coöperate with respective toothed segments 34 mounted upon the side member 11. By manipulating the levers 29 and 30 it will be obvious that the angle of the axes of rotation of the cylinders 23 and 24 can be varied within certain limits.

Rising from the end members 12 and 13 respectively are standards 35 which support a longitudinal beam 36 which latter carries adjacent each end an operator's seat 37. Each of the end members 12 and 13 is provided with a draft connection 38 whereby the harrow may be drawn either end first.

If it is desired to utilize the cylinder 23 as a pulverizer the operator will occupy the seat 37 adjacent the cylinder 24 and the sprocket chain 22 will be engaged on the sprocket wheel 18 and sprocket wheel 16. Under these conditions the cylinder 23 will rotate more rapidly than the cylinder 24 and cut and dig the soil.

If it is desired to separate and remove trash from the soil the cylinder 23 is adjusted diagonally of the frame A in the manner previously referred to and the seat 37 adjacent said cylinder is occupied by the operator. The sprocket wheels 18 and 20 are then connected by a sprocket chain. Under these conditions the cylinder 23 will rotate very slowly compared to the cylinder 24 and during this rotation will gather and work the trash to one side of the machine. Such rotation of the cylinder 23 will be opposite to that of the cylinder 24 which latter will roll and drag as will be obvious.

What is claimed is:—

A harrow comprising a frame, shafts rotatably mounted in one side of said frame, toothed cylinders having corresponding trunnions connected to respective shafts by a universal joint, the other trunnions of said cylinders being slidably engaged in slots respectively formed in the adjacent side member of the frame, levers pivoted to the last named side of said frame, links connecting said levers to the adjacent trunnions of said cylinders, and means for locking said levers in an adjusted position.

In testimony whereof, I affix my signature, in the presence of two witnesses.

ULYSSES G. CADY.

Witnesses:
IRA E. LANGLEY,
JAMES A. PANTING.

Copies of this patent may be obtained for five cents each, by addressing the "Commissioner of Patents, Washington, D. C."